(12) United States Patent
Shafie et al.

(10) Patent No.: US 11,667,544 B2
(45) Date of Patent: Jun. 6, 2023

(54) SUSTAINABLE AND CIRCULAR WATER DEMINERALIZATION WITH ZERO WASTE DISCHARGE

(71) Applicant: Effluent Free Desalination Corporation, Spokane, WA (US)

(72) Inventors: Shahram Shafie, Austin, TX (US); Roberta S. Magnuson, Spokane, WA (US)

(73) Assignee: EFFLUENT FREE DESALINATION CORPORATION, Spokane, WA (US)

( * ) Notice: Subject to any disclaimer, the term of this patent is extended or adjusted under 35 U.S.C. 154(b) by 0 days.

(21) Appl. No.: 17/142,620

(22) Filed: Jan. 6, 2021

(65) Prior Publication Data

US 2022/0212955 A1 Jul. 7, 2022

(51) Int. Cl.
| | |
|---|---|
| *C02F 1/16* | (2023.01) |
| *C02F 1/04* | (2023.01) |
| *C02F 1/12* | (2023.01) |
| *B01D 1/00* | (2006.01) |
| *B01D 1/18* | (2006.01) |
| *B01D 1/28* | (2006.01) |
| *B01D 1/20* | (2006.01) |
| *C02F 103/08* | (2006.01) |

(52) U.S. Cl.
CPC .............. *C02F 1/16* (2013.01); *B01D 1/0058* (2013.01); *B01D 1/18* (2013.01); *B01D 1/20* (2013.01); *B01D 1/2806* (2013.01); *B01D 1/2846* (2013.01); *C02F 1/043* (2013.01); *C02F 1/048* (2013.01); *C02F 1/12* (2013.01); *B01D 2258/0283* (2013.01); *C02F 2103/08* (2013.01); *C02F 2303/10* (2013.01)

(58) Field of Classification Search
CPC .. C02F 1/043; C02F 1/048; C02F 1/12; C02F 1/16; C02F 2103/08; C02F 2303/10; B01D 1/0058; B01D 1/18; B01D 1/20; B01D 1/2806; B01D 1/2846; B01D 2258/0283

See application file for complete search history.

(56) References Cited

U.S. PATENT DOCUMENTS

| | | | | |
|---|---|---|---|---|
| 3,613,333 | A * | 10/1971 | Gardenier | C21C 5/40 95/225 |
| 3,704,570 | A * | 12/1972 | Gardenier | B01D 47/10 95/227 |
| 3,782,074 | A * | 1/1974 | Gardenier | B01D 47/10 95/13 |
| 4,882,009 | A * | 11/1989 | Santoleri | B01D 1/14 159/901 |

(Continued)

FOREIGN PATENT DOCUMENTS

| | | |
|---|---|---|
| CN | 102139982 B | 7/2013 |
| CN | 107207286 A | 9/2017 |

(Continued)

*Primary Examiner* — Jonathan Miller
(74) *Attorney, Agent, or Firm* — Katten Muchin Rosenman LLP

(57) ABSTRACT

The present disclosure is concerned with sea water demineralization. More specifically, to systems, methods, and apparatus for water demineralization and purification, including the removal of dissolved solids and contaminants from sea water, industrial water with mineral content, and brackish water.

19 Claims, 5 Drawing Sheets

(56) References Cited

U.S. PATENT DOCUMENTS

| | | | | |
|---|---|---|---|---|
| 6,699,369 B1* | 3/2004 | Hartman | .................. | B01D 1/18 |
| | | | | 159/48.1 |
| 7,357,849 B2* | 4/2008 | Wright | ...................... | C02F 1/10 |
| | | | | 202/172 |
| 8,066,845 B2* | 11/2011 | Duesel, Jr. | ................. | C02F 1/10 |
| | | | | 210/767 |
| 9,770,671 B2* | 9/2017 | Curlett | ..................... | B01D 1/14 |
| 9,808,738 B2* | 11/2017 | Duesel, Jr. | ............. | C02F 1/048 |
| 10,927,025 B2* | 2/2021 | Gaspard | ................... | B01D 1/14 |
| 2007/0125719 A1* | 6/2007 | Yarbrough | ............... | C02F 9/00 |
| | | | | 210/194 |
| 2008/0156731 A1 | 7/2008 | Gordon | | |
| 2012/0292176 A1* | 11/2012 | Machhammmer | ....... | B01D 1/16 |
| | | | | 202/153 |
| 2014/0014278 A1* | 1/2014 | Duesel, Jr. | ................ | C02F 1/10 |
| | | | | 159/31 |
| 2021/0139346 A1* | 5/2021 | Shabgard | ................. | C02F 1/265 |
| 2022/0212955 A1* | 7/2022 | Shafie | ...................... | C02F 1/16 |

FOREIGN PATENT DOCUMENTS

| | | |
|---|---|---|
| DE | 19654196 A1 | 5/2019 |
| JP | 2005-508243 A | 3/2005 |
| JP | 2011-240241 A | 12/2011 |
| JP | 2014-237118 A | 12/2014 |
| KR | 10-0659375 B1 | 12/2006 |
| KR | 10-2011-0075384 A | 7/2011 |
| WO | 2010018249 A1 | 2/2010 |

\* cited by examiner

SUSTAINABLE AND CIRCULAR WATER DEMINERALIZATION WITH ZERO WASTE DISCHARGE

TECHNICAL FIELD

The subject matter described herein relates generally to sea, brackish, or industrial water demineralization. More specifically, to systems, methods, and apparatus for water demineralization and purification, including the removal of dissolved solids and contaminants from sea water with zero waste discharge.

BACKGROUND

The world has a shortage of potable water for drinking and water for agricultural, irrigation, and industrial use. In some parts of the world, prolonged drought and chronic water shortages have slowed economic growth and may eventually cause the abandonment of certain population centers. In other parts of the world, an abundance of fresh water exists, but the water is contaminated with chemicals and minerals from industrial sources and agricultural practices.

Global population growth has increased the demand on drinking water supplies, while the available water has not changed. In the coming decades, in addition to improving water reuse efficiency and promoting water conservation, the global population will need to provide for additional water resources at a cost and in a manner that supports urban, rural, and agricultural prosperity, while maintaining environmental protection.

Drinking water is in short supply throughout a considerable part of the world. This is one of the reasons why demineralization (i.e., desalination) of sea water has become an increasingly popular method to create drinking water. In this context, desalination means that salt and minerals, which are dissolved in the sea water, are removed. This desalination may be accomplished using a land-based desalination plant. However, the desalination of sea water using a land-based plant in quantities large enough to supply a major population center or large scale irrigation projects presents many problems. One issue is the method used to desalinate the sea water. Common desalination methods include evaporation and reverse osmosis.

Evaporation methods may include either single or multi evaporative systems. These systems operate under methods that include steps such as heating water (for example sea, industrial, or brackish water) mostly under partial vacuum, condensing the water vapor thus produced, and isolating the distillate. However, the isolated distilled water is only a fraction of the total feed water that was originally fed into the system. During evaporation, salt and minerals are left behind, so that the separated, distilled water contains minimal amounts of salts or minerals. Once separated from the distilled water, the salt and minerals left behind stay with the water remaining in the system. Eventually, this combination of remainder water, salt, and minerals must be discharged from the system.

Facilities equipped for evaporative methods that exist today are mostly land-based large-scale facilities which are connected to existing water supply systems. These plants that desalinate sea water through evaporation methods produce two streams of water. One is the fresh desalinated water and the other is mineral concentrated water, commonly known as brine. The brine water is also known as outflow water and needs to be discharged from the system. In most cases the brine water is released back to a water source such as a river, lake, gulf, sea, or ocean. This process introduces contaminants into the environment. Further, these plants consume enormous amounts of energy.

Reverse osmosis (RO) methods involve a membrane-based process in which water is demineralized or purified using high hydraulic pressure as the driving force. The salt ions and other contaminants are excluded or rejected by the reverse osmosis membrane while pure water is forced through the membrane. Reverse osmosis can remove approximately 95% to approximately 99% of the dissolved salts, silica, colloids, biological materials, pollution, and other contaminants in water. Similar to the evaporative system, reverse osmosis generates two streams of water. One of these streams is the fresh desalinated water and the other is the brine water. Also, in this system, the brine water needs to be discharged from the system and is often discharged back to a water source such as a river, lake, gulf, sea, or ocean.

In light of the challenges surrounding demineralization of water (such as desalination and purification of sea, brackish, or industrial water), there is a need for new systems, methods, and apparatus for water demineralization and purification with zero discharge that creates a sustainable and circular solution. Such an approach would also bring harmony to water production in marine ecology and costal environments.

BRIEF SUMMARY

Briefly described, the currently disclosed subject matter comprises demineralization systems and methods of use. In particular, in one embodiment the demineralization system comprises a source of heated gas, such as flue gas, a gas cooling apparatus to cool the heated flue gas, a gas compressor to increase the pressure of the gas, a brine intake to import brine to the system, a heat exchanger to heat the brine, a spray nozzle or other drying system to disperse the heated brine and separate the water from the particulates, and a drying chamber to facilitate isolation of potable or distilled water from the brine and creation of a solid/slush mineral salt discharge. This system has advantages in cost, waste reduction, and overall efficiency when compared to currently available demineralization systems.

Accordingly, a first aspect of the presently disclosed subject matter is a demineralization system comprising a gas intake, a gas cooler connected to the gas intake, a compressor connected to the gas cooler, a spray dryer or other drying system connected to the compressor, a primary heat exchanger, and a brine intake.

In another aspect, the presently disclosed subject matter is a demineralization system that further comprises a secondary heat exchanger, a drying chamber, and a secondary dryer.

In another aspect, the presently disclosed subject matter is directed to methods for the use of the demineralization system where these methods include a process for desalination of brine, wherein the method comprises: obtaining flue gas from a flue gas source, passing the flue gas through a flue gas cooler such that the temperature of the flue gas after exiting the flue gas cooler is lower than the temperature of the flue gas before entering the flue gas cooler, passing the lower temperature flue gas to a spray dryer or other drying system, mixing the lower temperature flue gas with heated brine, and spraying the mixture in a drying chamber. In a preferred embodiment, the flue gas is injected into the demineralization system for direct use. In a further embodiment, the injected flue gas is an essential part of the process that is not used solely for the purposes of energy capture.

These and other aspects are disclosed in further detail below.

BRIEF DESCRIPTION OF THE FIGURES

Like reference numbers refer to corresponding parts throughout the different views shown in the figures.

DETAILED DESCRIPTION

Figure 1:
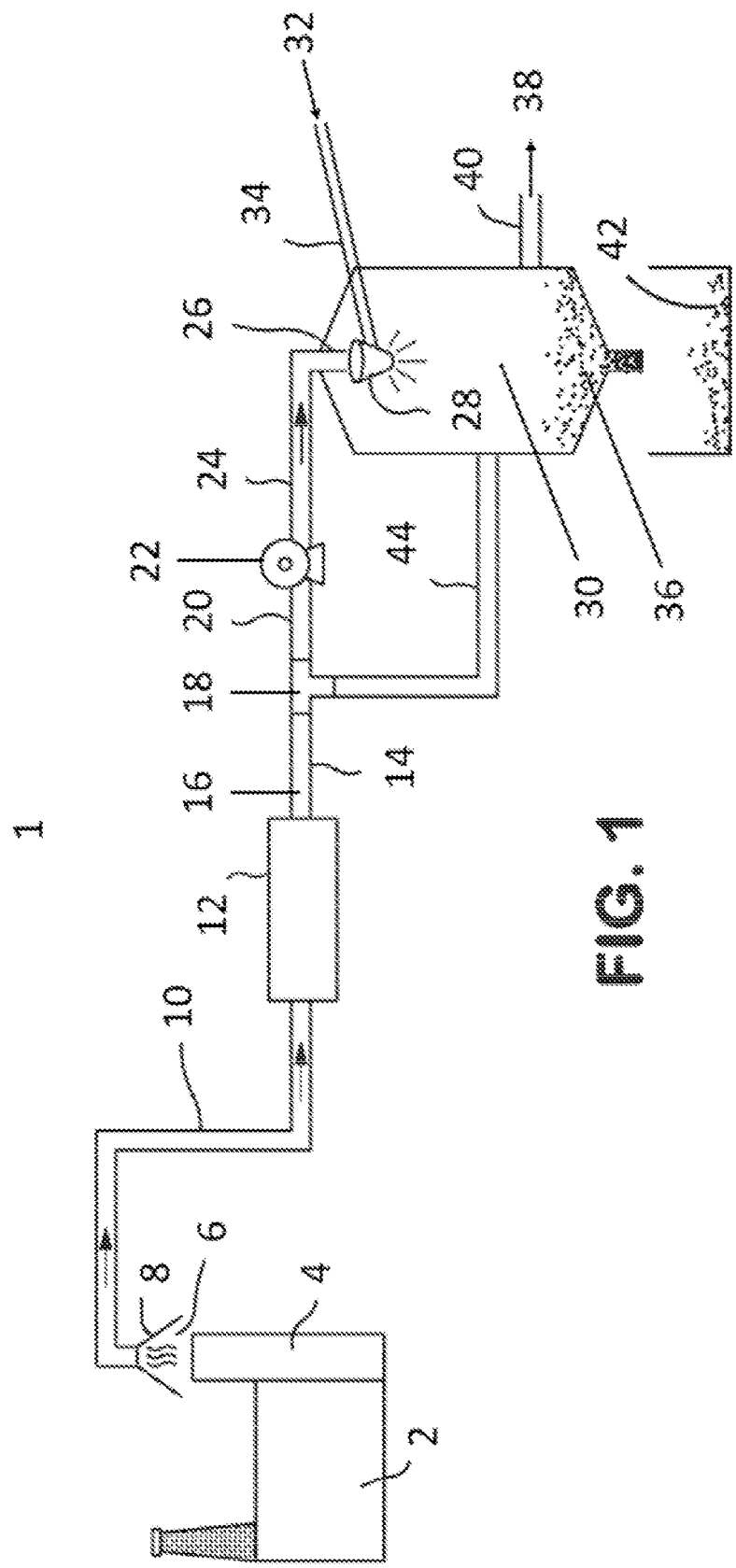
FIG. 1 shows a system configured in accordance with an embodiment of the currently disclosed subject matter.

The presently disclosed subject matter provides systems, methods, and apparatus for producing water.

In an embodiment, the currently claimed subject matter comprises: a demineralization system comprising a gas intake, a gas cooler, a compressor, a spray dryer, a heat exchanger, and a brine intake.

The present invention can be understood more readily by reference to the following detailed description of the invention included therein. However, many modifications and other embodiments of the presently disclosed subject matter set forth herein will come to mind to one skilled in the art to which the presently disclosed subject matter pertains, when this skilled artisan has the benefit of the teachings currently presented. Therefore, it is to be understood that the presently disclosed subject matter is not to be limited to the specific embodiments disclosed and that modifications and other embodiments are intended to be included within the scope of the appended claims.

Before the present apparatus, systems, and/or methods are disclosed and described, it is to be understood that they are not limited to specific methods unless otherwise specified. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

A. Definitions

Listed below are definitions of various terms used to describe this invention. These definitions apply to the terms as they are used throughout this specification, unless otherwise limited in specific instances, either individually or as part of a larger group.

As used in the specification and the appended claims, the singular forms "a," "an," and "the" include plural referents unless the context clearly dictates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. Further, as used herein, the term "about," when referring to a value, is meant to encompass variations of in some embodiments ±20%, in some embodiments ±15%, in some embodiments ±10%, in some embodiments ±5%, in some embodiments ±1%, in some embodiments ±0.5%, and in some embodiments ±0.1%, from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges, which may independently be included in the smaller rangers is also encompassed, subject to any specifically excluded limit in the stated range. Where the stated range includes one or both of the limits, ranges excluding either or both of those included limits are also included.

As used herein, the term "optional" or "optionally" means that the subsequently described event or circumstance can or cannot occur, and that the description includes instances where said event or circumstance occurs and instances where it does not.

The term "or" is not to be construed as identifying mutually exclusive options. For example, the phrase "X contains A or B" can mean that X contains A and not B, X contains B and not A, or X contains both A and B. That is, the term "or" is used to mean "and/or" unless explicitly indicated to refer to alternatives only or the alternatives are mutually exclusive, although the disclosure may support a definition that refers to only alternatives and "and/or." As used herein, "another" can mean at least a second or more.

As used herein, the term "psig" (pounds per square inch gauge) refers to a pressure measurement that is taken relative to atmospheric pressure. As used herein, the term "psi" (pounds per square inch) refers to a pressure measurement that is taken relative to a vacuum and may also be called "psia" (pounds per square inch absolute). By way of a non-limiting example, atmospheric pressure at sea level is about 14.7 psi. Thus, at sea level, psig and psi are related by the equation psig+14.7=psia.

As used herein, the term "impure water" refers to any type of water which is not potable. Non-limiting examples of non-potable water include sea water, salt water, brackish water, industrial water, sewage, brown water, blowdown water, and the like. The systems, apparatus, and methods described herein remove dissolved mineral solids and contaminants from all listed types of water. Further, the water source for any of the listed types of water may be from any source. Non-limiting examples of a water source include natural sources such as the sea, a river, a lake, a gulf, and an ocean; and non-natural sources, such as industrial water emanating from a manufacturer, oil refinery, cooling tower, boiler or wastewater treatment facility.

As used herein, the term "blowdown water" refers to water with a high concentration of minerals. The "blowdown water" is typically the water discharge from steam boilers and/or cooling towers in industrial settings.

As used herein, the term "brine" refers to water with minerals or other chemicals dissolved in the water.

As used herein, the terms "mineral(s)," and "salt(s)" refer to natural minerals, salts, and elements. Non-limiting examples of the minerals and salts referenced herein include sodium chloride, magnesium, calcium, carbonate, bicarbonate, sodium, sulfate, silica, chloride, and fluoride.

As used herein, the terms "pollutant(s)" and "contaminant(s)" refer to any physical, chemical, biological, or radiological substance or matter in water. These pollutants and contaminants may be naturally occurring or man-made. Non-limiting examples of pollutants and contaminants include chemical contaminants (i.e., bleach, pesticides, metals, and toxins), biological contaminants (i.e., microbes, bacteria, viruses, protozoan, and parasites), and physical contaminants (i.e., sediment or organic matter suspended in the water).

As used herein, the term "demineralization" refers to the general process of water purification. For example, it is used to mean, in relation to the purification process, the removal of materials such as minerals, salts, pollutants, contaminants, and the like from water. In a like manner, the term "desalination" refers to the general process for removal of minerals and salts from water, and in particular sea or salt water.

As used herein, the term "spray" refers to the state in which the fluid is atomized to very small particles. In particular, the term "spray" may refer to a fluid that is under greater pressure before passing through a nozzle of the spray dryer or other drying system than before traversing through such a nozzle. In some embodiments, the term "spray" may refer to the projection of the fluid through the rotating surface to the drying chamber. For example, "spray" may refer to a stream of finely divided streams, particles, or droplets. Moreover, "spray" may refer to a stream projection with a cross section that increases in width as it dispenses from the nozzle of the spray dryer. In either embodiment, the term "pressurized fluid" may refer to a fluid under a sufficient amount of pressure with which to cause the fluid to spray. This is distinctly different from a dispensing element which does not include sufficient pressure to "spray" the fluid. In such a dispensing element, the fluid is dispensed in a continuous stream and is generally at the same pressure as the supply source.

The term "comprising" (and its grammatical variations), as used herein, is used in the inclusive sense of "having" or "including" and not in the exclusive sense of "consisting of."

B. Demineralization Systems

Embodiments of the present invention comprise systems, methods and apparatus for demineralizing water from sea water, brackish, and/or polluted water. The systems, methods, and apparatus for demineralizing water described herein can generally be operable such that they provide purified water consistent with the standards and requirements generally imposed on purification plants and systems.

With reference now to the drawings, in an embodiment is presented a demineralization system 1 in accordance with the system depicted in FIG. 1. As depicted in FIG. 1, there is a source of gas, such as power plant 2. The gas produced may be flue gas. The source of flue gas is not particularly limited and can be any source of flue gas known in the art. Non-limiting examples of the sources of flue gas include power plants, factories, industrial complexes, and the like. More specifically, the source of flue gas may be discharge from a boiler or heating sources at a plant. The flue gas 6 flows through the flue gas discharge stack 4 into the flue gas collection system 8. The flue gas collection system 8 is also referred to herein as a gas intake.

The composition of flue gas 6 is not particularly limited and primarily comprises nitrogen, carbon dioxide ($CO_2$), and water. Flue gas from the combustion of fossil fuels contains very small amounts of nitrogen oxides (NOx), sulfur dioxide ($SO_2$) and particulate matter. The flue gas will also be low in oxygen ($O_2$) concentration. Flue gases from natural gas-fired power plants may contain 8-10% $CO_2$, 18-20% $H_2O$, 2-3% $O_2$, and 67-72% $N_2$; flue gases from coal-fired boilers may contain 12-14 vol % $CO_2$, 8-10 vol % $H_2O$, 3-5 vol % $O_2$ and 72-77% $N_2$. In some embodiments, the flue gas contains from about 67% to about 77% $N_2$, from about 8% to about 14% $CO_2$, and about 2% to about 5% $O_2$.

The flue gas 6 will have a temperature in the range from about 200° C. to about 1,200° C. In some embodiments, the temperature of flue gas 6 originating from the power plant 2 will be in the range from about 300° C. to about 1,000° C., from about 400° C. to about 800° C., or from about 500° C. to about 600° C. In some embodiments, the temperature of flue gas 6 originating from the power plant 2 will be at least about 300° C., at least about 400° C., at least about 500° C., at least about 600° C., at least about 700° C., at least about 800° C., at least about 900° C., at least about 1,000° C., or at least about 1,100° C. In some embodiments, the temperature of the flue gas 6 originating from the power plant 2 will be less than about 1,200° C., less than about 1,100° C., less than about 1,000° C., less than about 900° C., less than about 800° C., less than about 700° C., less than about 600° C., less than about 500° C., less than about 400° C., or less than about 300° C.

While the flue gas 6 may have a high temperature component, the advantages associated with the use of flue gas are not limited to the transfer of heat or the capture of energy. The flue gas acts as an essential component of the heat integration and energy optimization of the whole system. Further, the oxygen content of flue gas is much lower than air. A typical flue gas from natural gas has a composition of about 2-3% $O_2$, 67-72% $N_2$, 8-10% $CO_2$, and 18-20% $H_2O$, compared to air which has a composition of about 21% $O_2$ and 79% $N_2$. This makes flue gas an operationally safer gas for compression and exhibits chemical inactivities as a relatively inert gas. Accordingly, in some embodiments, an essential component of the demineralization system is the direct injection of flue gas 6 into the system. Instead of using an energy capture system where the high temperature flue gas may heat water, the flue gas serves as a propellant for moving liquids and solids through the demineralization system.

Flue gas 6 flows from the flue gas collection system 8 through conduit 10 into flue gas cooler 12. In some embodiments, the temperature of the flue gas immediately before entering gas cooler 12 is different from the temperature of the flue gas originating from the power plant. In some embodiments, the temperature of flue gas 6 immediately before entering gas cooler 12 is in the range from about 300° C. to about 1,000° C., from about 400° C. to about 800° C., or from about 500° C. to about 600° C. In some embodiments, the temperature of flue gas 6 immediately before entering gas cooler 12 is at least about 300° C., at least about 400° C., at least about 500° C., at least about 600° C., at least about 700° C., at least about 800° C., at least about 900° C., at least about 1,000° C., or at least about 1,100° C. In some embodiments, the temperature of flue gas 6 immediately before entering gas cooler 12 is less than about 1,200° C., less than about 1,100° C., less than about 1,000° C., less than about 900° C., less than about 800° C., less than about 700° C., less than about 600° C., less than about 500° C., less than about 400° C., or less than about 300° C.

Gas, such as flue gas, at temperatures above about 375° C. (which is the critical temperature of sea water under pressure of about 22 MPa) is not useable in subsequent portions (i.e., portions located after the gas cooler 12) of the demineralization system disclosed herein. This is due to the fact that when the flue gas is above about 375° C. and the flue gas comes into contact with salt water or water with minerals (such as sea water), the high temperature flue gas causes detrimental chemical reactions. For example, at very high temperatures above 750° F. (about 400° C.) or very high pressure, sulfuric acid may be produced. As such, the flue gas needs to be cooled below about 375° C. before use in later parts of the demineralization system.

Flue gas 6 flows through flue gas cooler 12 and into conduit 14. The flue gas in conduit 14 is flue gas 6 with a lower temperature than before entry into flue gas cooler 12. This lower temperature flue gas, referred to herein as flue gas output 16, has a temperature in the range from about 200° C. to about 375° C., from about 250° C. to about 350° C., or from about 275° C. to about 325° C. In some embodiments, the temperature of flue gas output 16 is at least about 200° C., at least about 225° C., at least about 250° C., at least about 275° C., at least about 300° C., at least about 325° C., or at least about 350° C. In some embodiments, the temperature of the flue gas output 16 is less than about 375° C., less than about 350° C., less than about 325° C., less than about 300° C., less than about 275° C., less than about 250° C., or less than about 225° C.

In some embodiments, flue gas output 16 is at a pressure in a range from about 0 psig to about 30 psig, from about 5 psig to about 20 psig, or from about 10 psig to about 15 psig. In some embodiments, flue gas output 16 is at a pressure of at least about 0 psig, at least about 5 psig, at least about 10 psig, at least about 15 psig, at least about 20 psig, or at least about 25 psig. In some embodiments, flue gas output 16 is at a pressure less than about 30 psig, less than about 25 psig, less than about 20 psig, less than about 15 psig, less than about 10 psig, or less than about 5 psig.

Flue gas output 16 flows through conduit 14, then through junction 18, then through conduit 20, to compressor 22. The junction may be any method used to split a flow into two or more outputs. For example, the junction may be a three way valve. Compressor 22 increases the pressure of the flue gas. The flue gas exits from compressor 22 into conduit 24. The pressure of flue gas in conduit 24, in some embodiments, is in a range from about 300 psig to about 4,000 psig, from about 400 psig to about 3,000 psig, from about 500 psig to about 2,000 psig, or from about 750 psig to about 1,000 psig. In some embodiments, the pressure of the flue gas in conduit 24 is at least about 300 psig, at least about 400 psig, at least about 500 psig, at least about 750 psig, at least about 1,000 psig, or at least about 2,000 psig. In some embodiments, the pressure of the flue gas in conduit 24 is less than about 3,000 psig, less than about 2,000 psig, less than about 1,000 psig, less than about 750 psig, less than about 500 psig, or less than about 400 psig.

The flue gas flows from conduit 24 to pressurized gas input 26 and then to a drying system.

In an embodiment, the drying system comprises a spray dryer, such as spray dryer 28. In some embodiments, spray dryer 28 comprises a nozzle. In some embodiments, the nozzle is an atomizing nozzle, a spray nozzle, or a rotating disc nozzle. In alternate embodiments, the drying system comprises a drying chamber, fluidized bed or vacuum chamber.

In embodiments comprising a nozzle, the flue gas flows to the spray dryer and then through the nozzle. The spray dryer 28 is located in drying chamber 30. The nozzle may be static or rotating.

The demineralization system described herein is in contact with a source of impure water 32 through conduit 34. The conduit 34 may be connected to any source of impure water. Such sources can include natural and non-natural sources. Natural sources can include the sea, a river, a lake, a gulf, and an ocean. Non-natural sources can include industrial water emanating from a manufacturer, oil refinery, or wastewater treatment facility. In an embodiment, the demineralization system 1 is connected to a manufacturer. In another embodiment, the source of impure water has an existing water purification system, such as a reverse osmosis system. In a further embodiment, the demineralization system 1 is connected to the water purification system as the source of impure water. In a further embodiment, the demineralization system 1 works in tandem with the water purification system to purify the discharge from the water purification system. In a particular embodiment, the demineralization system 1 is connected to the water discharge of a water purification system, where the water purification system is connected to an industrial source of impure water.

Impure water 32, such as salt water (i.e., brine), brackish water, or brown water flows through conduit 34 to spray dryer 28. The spray dryer 28 creates droplets of impure water 32, which increase the surface area of the water droplets associated with the mixture of flue gas and impure water. Increasing the surface area of the impure water enables vaporization of water from the impure water at a much higher rate when compared to the vaporization rate of bulk water (i.e., water that has not gone through a spray dryer with an atomizer). In some embodiments, the impure water is salt water.

The impure water 32 may contain a percentage of dissolved salts and/or minerals. In an embodiment, the impure water 32 is sea water, which has about a 3.5% salt content. In other embodiments, the impure water 32 comes from a natural source (such as sea water) and has a dissolved salt and/or mineral content in the range from about 1% to about 20%, from about 2% to about 10%, or from about 3% to about 5% of the total composition of the impure water. In still other embodiments, the impure water 32 is from an industrial source where the dissolved salt and/or mineral content is in the range from about 10% to about 70%, from about 20% to about 60%, or from about 30% to about 50% of the total composition of impure water.

While the spray dryer with a nozzle may reduce the vapor pressure, the demineralization system described herein does not operate under a vacuum to reduce the pressure in the system. This is in contrast to most currently existing systems that do use a vacuum system to reduce the pressure in the overall system, and facilitating evaporation of water. Accordingly, in an embodiment is disclosed herein a demineralization system that does not operate under a vacuum. Likewise, the demineralization system does not comprise a vacuum system.

Drying chamber 30 receives the spray of impure water 32 and produces a solid component 36 and gaseous component and water vapor 38, where gaseous component 38 is substantially free of dissolved solids. Gaseous component 38 exits from drying chamber 30 through conduit 40. The solid component 36 settles in drying chamber 30 and is then moved from drying chamber 30 into storage area 42. In some embodiments, gaseous component 38 comprises water vapor which may be condensed to provide potable water. In some embodiments, there exist more than one conduit 40, such that gaseous component 38 exits drying chamber through more than one opening. In some embodiments, there exist two, three, four, five, or more exit points for gaseous component 38.

In some embodiments, gaseous component 38 is condensed to water. The water is purified and free from minerals, salts, pollutants, contaminants. The water may be referred to as distilled water. Regardless of the terms used to describe the purified water, this water is potable. In an embodiment, salt and/or minerals are added to the distilled water to improve taste, add nutrients, and the like. The purified water has many different uses. It can be used as drinking water, provided to companies for use (such as pharmaceutical companies), for watering plants, in aquarium settings, for agricultural uses, for sterile medical uses (such as in continuous positive airway pressure (CPAP) devices), and in automotive settings (such as in car cooling systems).

The solid component 36 comprises the solids originally present in the impure water. These solids can comprise salts, minerals, pollutants, contaminants, and any combination thereof. In an embodiment, the solid component is a salt. In some embodiments, solid component 36 is present with residual water, such that the solid component is present at a high concentration in the residual water.

Drying chamber 30 has a closed top and a closed bottom, where inlets and exits are provided for flows into and out of the drying chamber. The closed bottom may have a conical shape to facilitate sliding of the solids to an outlet. If the bottom is conical, a preferred shape is a cone having an interior cross-section angle of 60 degrees.

In some embodiments, flue gas output 16 flows through junction 18 into conduit 44 and then to drying chamber 30.

Figure 2:
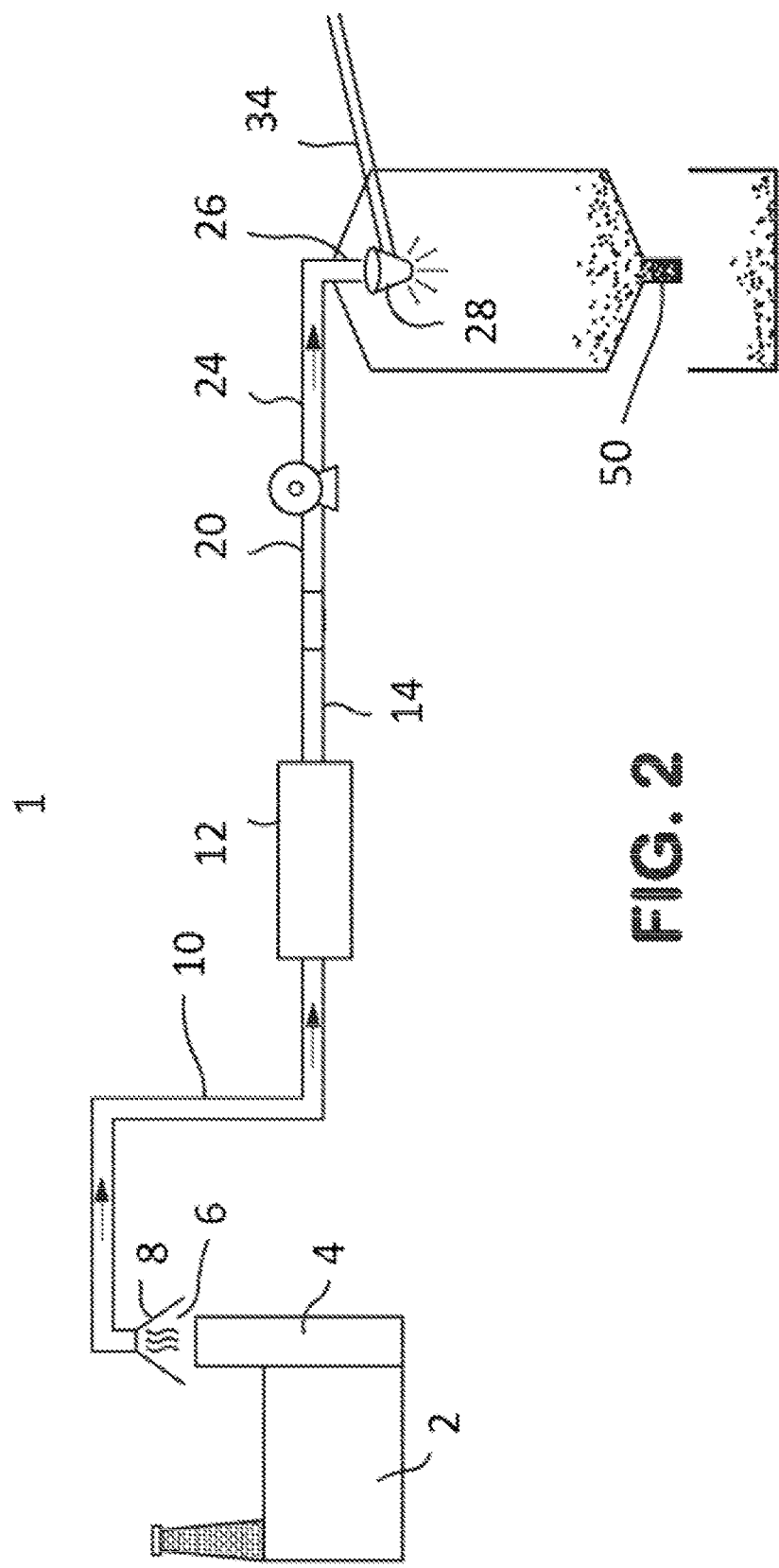
FIG. 2 shows a system configured in accordance with another embodiment of the currently disclosed subject matter.

Depicted in FIG. 2 is an alternate embodiment of demineralization system 1. In this alternate embodiment, demineralization system 1 does not have junction 18 or conduit 44. Also depicted is spout 50, through which solid component 36 may flow. In any embodiment described herein, spout 50 may be present to allow for discharge of components such as solid component 36.

Figure 3:
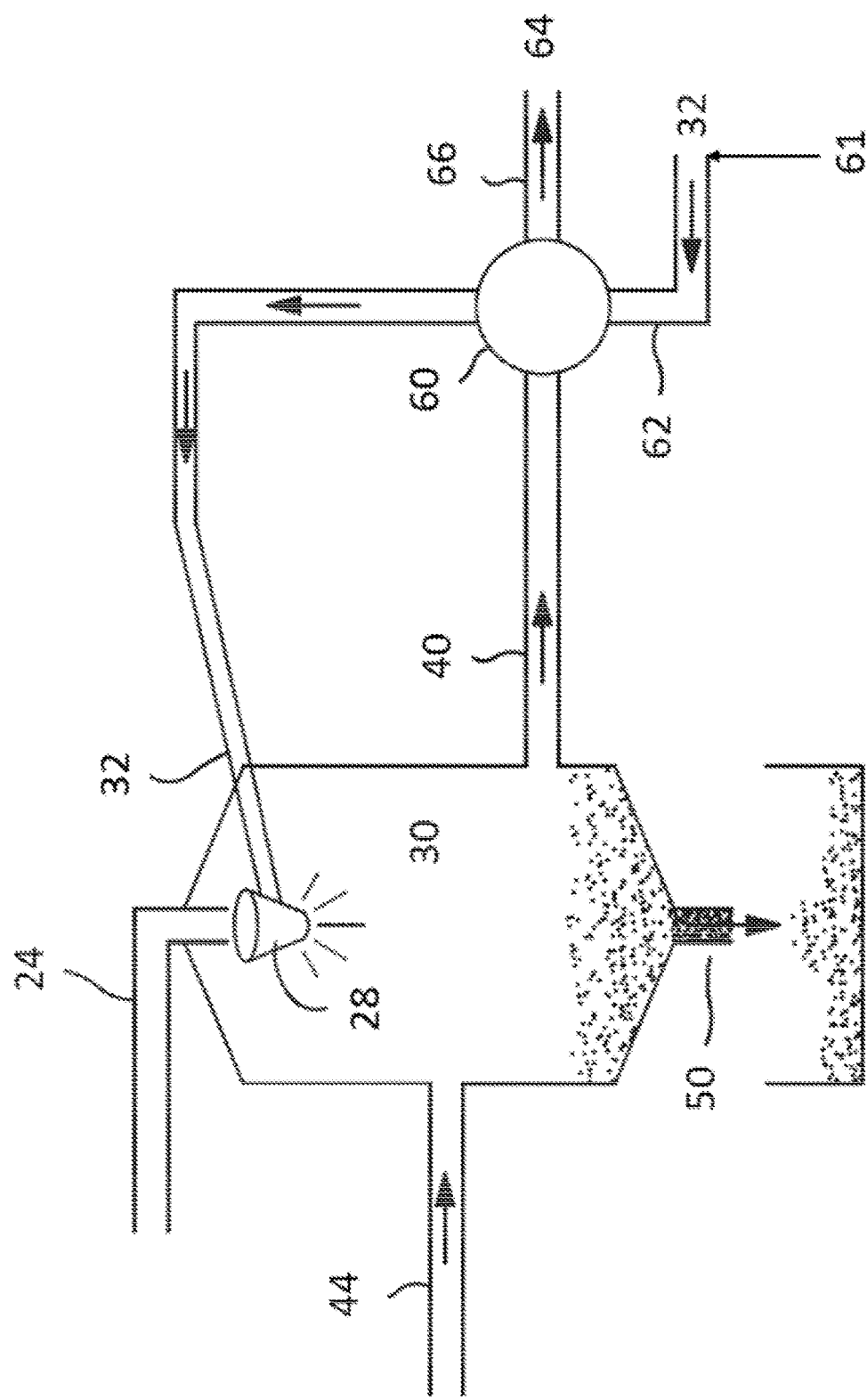
FIG. 3 shows another embodiment of the currently disclosed subject matter which includes, among other components, a primary heat exchanger.

Depicted in FIG. 3 is an alternate embodiment of demineralization system 1, where a heat exchanger is added to the system. As depicted, flue gas flows through conduit 24 into spray dryer 28. Flue gas also flows through conduit 44 into drying chamber 30. The gaseous component 38 flows through conduit 40 to primary heat exchanger 60. Impure water 32, such as salt water or brown water, is brought into the system through intake 61, such as a brine intake. In an embodiment, the brine flows through conduit 62 into primary heat exchanger 60. The impure water 32 may be at a cool temperature, such as ambient temperature. In some embodiments, the temperature of the water is about 5° C., about 10° C., about 15° C., about 20° C., about 25° C., or about 30° C. The impure water 32 is heated in the heat exchanger by the gaseous component 38. The heated impure water flows through conduit 32 to spray dryer 28, where it is mixed with the flue gas, which is also at a high temperature. After gaseous component 38 flows through primary heat exchanger 60, the temperature of gaseous component 38 is reduced, thereby fully or partially condensing water. The fully or partially condensed water 64 flows out of the heat exchanger through conduit 66.

The type of heat exchanger is not particularly limited. For example, non-limiting examples of the heat exchanger are a plate heat exchanger, a shell and tube heat exchanger, a plate and shell heat exchanger, an adiabatic wheel heat exchanger, a plate fin heat exchanger, a pillow plate heat exchanger, a fluid heat exchanger, a dynamic scraped surface heat exchanger, a phase-change heat exchanger, a waste heat recovery unit, a direct contact heat exchanger, and a microchannel heat exchanger. The heat exchanger may be pressurized or at atmospheric pressure.

Figure 4:
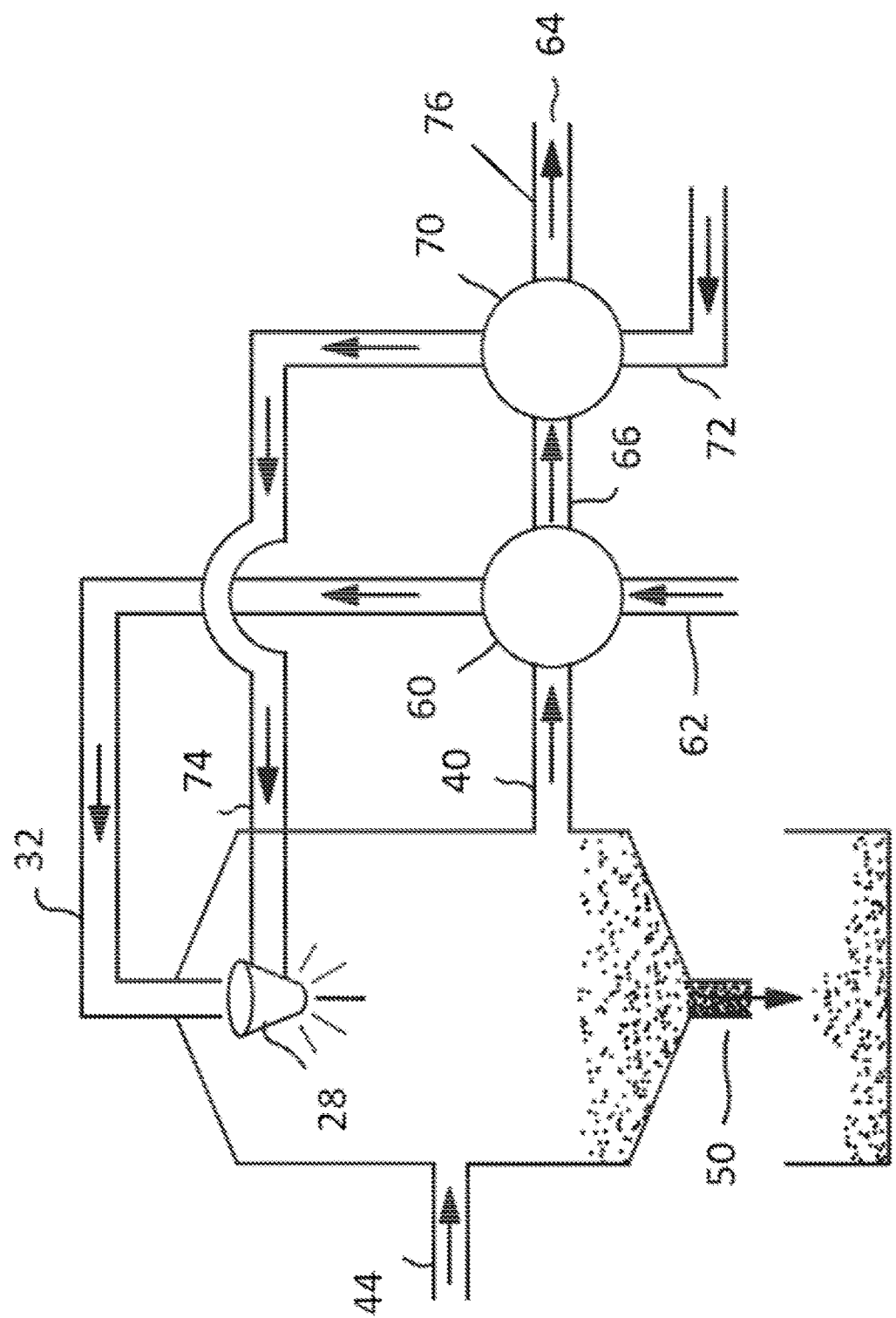
FIG. 4 shows another embodiment of the currently disclosed subject matter which includes, among other components, primary and secondary heat exchangers.

Depicted in FIG. 4 is an alternate embodiment of demineralization system 1, comprising two heat exchangers. In an embodiment, gaseous component 38 flows through conduit 40 into primary heat exchanger 60. The output from heat exchanger 60 flows through conduit 66. The output may be fully or partially condensed water 64 flowing through conduit 66 to secondary heat exchanger 70.

As described above, the heat exchangers heat the impure water close to the boiling point (such as salt water or brown water) before the water flows to the atomizer nozzle. Atomizing the hot water provides for efficient and rapid water evaporation inside the chamber, which produces a solid salt with less residual water content. In some embodiments, the heated impure water is heated to a temperature in a range from about 45° C. to about 150° C., from about 60° C. to about 140° C., from about 80° C. to about 130° C., from about 90° C. to about 120° C., or from about 100° C. to about 110° C. In some embodiments, the impure water is heated to a temperature at least about 45° C., at least about 60° C., at least about 80° C., at least about 90° C., at least about 100° C., at least about 110° C., or at least about 120° C. In some embodiments, the impure water is heated to about 45° C., to about 60° C., to about 80° C., about 85° C., about 90° C., about 95° C., about 100° C., about 105° C., about 110° C., about 115° C., about 120° C., about 125° C., or about 130° C.

Impure water at ambient temperature, where the impure water may be water such as salt water or brown water, flows into primary heat exchanger 60 through conduit 62 and also into secondary heat exchanger 70 through conduit 72. The impure water is heated in the heat exchangers. Upon exiting primary heat exchanger 60, the heated impure water flows through conduit 32 to spray dryer 28. Upon exiting secondary heat exchanger 70, the heated impure water flows through conduit 74 to spray dryer 28. Partially or completely condensed water 64 exits secondary heat exchanger 70 through conduit 76.

Figure 5:
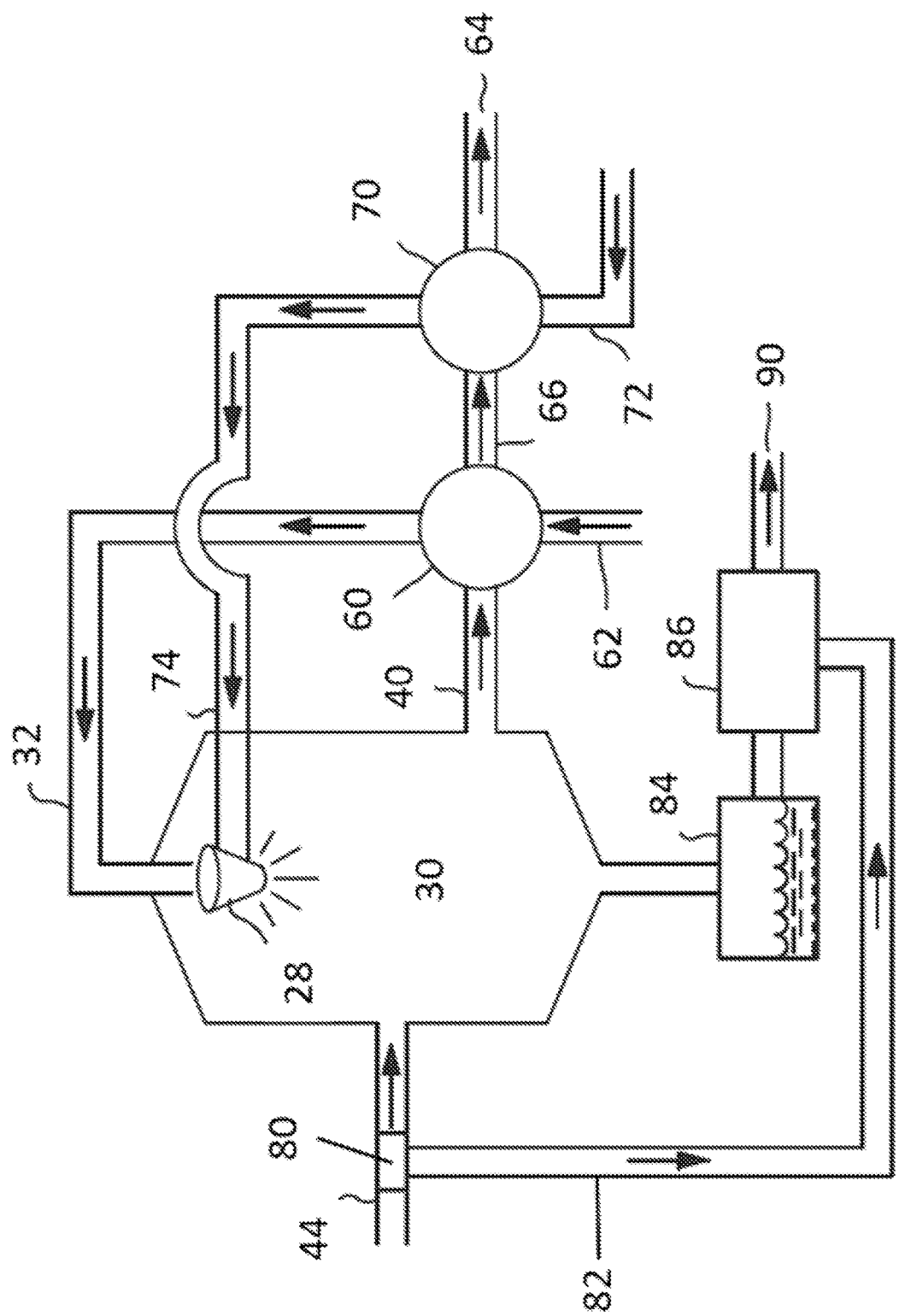
FIG. 5 shows another embodiment of the currently disclosed subject matter which includes, among other components, a secondary drying system.

Depicted in FIG. 5 is an alternate embodiment of demineralization system 1, comprising a secondary dryer. In an embodiment, flue gas 6 at a high temperature flows through junction 80 and then either into drying chamber 30 or through conduit 82. Drying chamber 30 has an outlet providing salt slush 84. Salt slush 84 flows to secondary dryer 86. Secondary dryer 86 also receives flue gas 6 at a high temperature through conduit 82. The mixing of high temperature flue gas and salt slush performs secondary drying of the salt slush and produces salt and/or minerals 90 with a low moisture.

In an embodiment, salt slush 84 comprises by weight, about 50% salt, about 55% salt, about 60% salt, about 65% salt, about 70% salt, about 75% salt, about 80% salt, about 85% salt, about 90% salt, or about 95% salt. In a preferred embodiment, salt slush 84 comprises about 75% salt. In an embodiment, salt slush 84 comprises more than about 50% salt, more than about 60% salt, more than about 75% salt, or more than about 90% salt. In an embodiment, salt slush 84 comprises less than about 95% salt, less than about 90% salt, less than about 80% salt, less than about 75% salt, or less than about 60% salt.

The solid component 36 or salt slush 84, or any mineral/salt/water mixture which is a product of the methods described herein may be further processed. Such processing may include the steps of isolating the mixture and allowing the remaining water to evaporate. The evaporation may occur under conditions where the mixture is heated. In an embodiment, the mixture is placed in a pool where the water is allowed to evaporate at ambient temperature. In a further embodiment, the pool is not a covered pool, but located open to the air. In such an embodiment, the water will evaporate at ambient temperature subject to any weather conditions present. Evaporation in this manner will leave a pool of solids, whether the solids be comprised of minerals, salts, or combinations thereof.

The solid component 36 or salt slush 84, or any mineral/salt/water mixture which is a product of the methods described herein, is to be removed from the system before the amount of solid, salt, contaminant, or the like, becomes too concentrated in the residual water. Should the concentrated mixture remain in the system for too long, salt buildup will occur, and this will negatively affect the demineralization system. In particular, the evaporative systems will be negatively affected. As such, when the solid component 36 or salt slush 84, or any mineral/salt/water mixture reaches a high concentration, this material must be discharged from the system. In some embodiments, the solid component 36 is in the range from about 90% to about 100%, about 92% to about 100%, about 94% to about 100%, about 96% to about 100%, or about 98% to about 100% of the mineral/salt/water mixture. In some embodiments, the water component is in the range from about 0% to about 10%, from about 0% to about 8%, from about 0% to about 6%, from about 0% to about 4%, or from about 0% to about 2%, in the mineral/salt/water mixture. The discharge methods are described further herein.

Described herein is a demineralization system 1, which provides potable water. In an embodiment, the system operates with minimal waste discharge. In some embodiments, the system operates with zero waste discharge. In other embodiments, the system uses the heat generated by the power plant to create a sustainable and energy efficient demineralization system.

Accordingly, a first aspect of the presently disclosed subject matter is a demineralization system, comprising a gas intake, a gas cooler connected to the gas intake, a compressor connected to the gas cooler, a spray dryer connected to the compressor, a primary heat exchanger, and a brine intake.

As in any above embodiment, a demineralization system wherein the compressor is connected to the spray dryer.

As in any above embodiment, a demineralization system wherein the gas intake is connected to a source of gas.

As in any above embodiment, a demineralization system wherein the source of gas produces flue gas.

As in any above embodiment, a demineralization system wherein the source of gas is a power plant or a factory.

As in any above embodiment, a demineralization system wherein the flue gas coming from the source has a temperature in a range between about 300° C. to 1000° C.

As in any above embodiment, a demineralization system wherein the flue gas contains from about 67% to about 77% $N_2$, from about 8% to about 14% $CO_2$, and about 2% to about 5% $O_2$.

As in any above embodiment, a demineralization system wherein the spray dryer comprises a nozzle.

As in any above embodiment, a demineralization system wherein the nozzle is an atomizing nozzle, a spray nozzle, or a rotating disc nozzle.

As in any above embodiment, a demineralization system wherein the flue gas source, gas cooler, and compressor are connected via conduits allowing the flue gas to flow from the gas source to the gas cooler to the compressor.

As in any above embodiment, a demineralization system wherein the flue gas is fed from the compressor to spray dryer and then fed through the spray dryer.

As in any above embodiment, a demineralization system wherein the spray dryer comprises a nozzle which is static or rotating.

As in any above embodiment, a demineralization system wherein the spray dryer is connected to the primary heat exchanger and the primary heat exchanger is further connected to the brine intake.

As in any above embodiment, a demineralization system wherein brine from the brine intake passes through the primary heat exchanger and then from the primary heat exchanger to the spray dryer.

As in any above embodiment, a demineralization system wherein water vapor from the spray dryer passes through the primary heat exchanger and preheats the brine in the primary heat exchanger at a temperature in the range from about 80° C. to about 130° C.

As in any above embodiment, a demineralization system further comprising a secondary heat exchanger, a drying chamber, and a secondary dryer.

As in any above embodiment, a demineralization system wherein the secondary heat exchanger is connected to the primary heat exchanger and the spray nozzle.

As in any above embodiment, a demineralization system wherein the drying chamber produces salt slush which comprises by weight, less than about 75% salt.

As in any above embodiment, a demineralization system wherein the system does not comprise a vacuum or a vacuum system.

As in any above embodiment, a demineralization system wherein the system is connected to the water discharge of a water purification system, where the water purification system is connected to an industrial source of impure water.

C. Methods of Using the System

The subject matter disclosed herein further relates to methods of operating the demineralization system. These methods include a process for demineralization of brine, wherein the method comprises: obtaining flue gas from a flue gas source, passing the flue gas through a flue gas cooler such that the temperature of the flue gas after exiting the flue gas cooler is lower than the temperature of the flue gas before entering the flue gas cooler, passing the lower temperature flue gas to a spray dryer, mixing the lower temperature flue gas with heated brine, and spraying the mixture in a drying chamber.

As in any above embodiment, a method which further comprises feeding the cooled flue gas to a compressor.

As in any above embodiment, a method which does not generate sulfuric acid.

As in any above embodiment, a method further comprising the step of passing water vapor from the spray dryer through a primary and/or a secondary heat exchanger.

As in any above embodiment, a method further comprising the step of obtaining brine through a brine intake.

As in any above embodiment, a method wherein the water vapor from the spray dryer and brine from the brine intake passes through the primary heat exchanger and the water vapor heats the brine to a temperature in the range between about 80 to about 130° C.

As in any above embodiment, a method wherein the water vapor from the spray dryer also passes through a second heat exchanger.

As in any above embodiment, a method which produces salt slush which comprises by weight, less than about 75% salt.

D. Advantages of Embodiments

Embodiments of the presently disclosed subject matter provide numerous advantages. Non-limiting examples of the advantages associated with the presently disclosed subject matter include an increase in the efficiency of salt water demineralization (i.e., desalination). Further, the cost is reduced when compared to presently available systems. The overall impact on the environment is lessened due to several factors, which include a reduction in waste product. For, in the currently disclosed demineralization system, there is almost zero waste associated with the disclosed systems and methods.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A demineralization system, comprising
a gas intake connected to a gas source producing flue gas,
a gas cooler connected to said gas intake,
a compressor connected to said gas cooler,
a spray dryer connected to said compressor,
a primary heat exchanger connected to said spray dryer, and
a brine intake connected to said primary heat exchanger,
wherein said gas source, gas cooler, and compressor are connected via conduits allowing the flue gas to flow from said gas source to said gas cooler to said compressor.

2. The demineralization system of claim 1, wherein said compressor is connected to said spray dryer.

3. The demineralization system of claim 1, wherein said source of is a power plant or a factory.

4. The demineralization system of claim 1, wherein said flue gas coming from said gas source has a temperature in a range between about 300° C. to 1000° C.

5. The demineralization system of claim 1, wherein said flue gas contains from about 67% to about 77% $N_2$, from about 8% to about 14% $CO_2$, and about 2% to about 5% $O_2$.

6. The demineralization system of claim 1, wherein said spray dryer comprises a nozzle.

7. The demineralization system of claim 6, wherein said nozzle is an atomizing nozzle, a spray nozzle, or a rotating disc nozzle.

8. The demineralization system of claim 1, wherein said flue gas is fed from said compressor to said spray dryer and then fed through said spray dryer.

9. The demineralization system of claim 8, wherein said spray dryer comprises a nozzle which is static or rotating.

10. The demineralization system of claim 1, wherein brine from said brine intake passes through said primary heat exchanger and then from said primary heat exchanger to said spray dryer.

11. The demineralization system of claim 10, wherein water vapor from said spray dryer passes through said primary heat exchanger and preheats the brine in said primary heat exchanger at a temperature in the range from about 80° C. to about 130° C.

12. The demineralization system of claim 1, further comprising
a secondary heat exchanger connected to said spray dryer,
a drying chamber connected to said primary heat exchanger, and
a secondary dryer connected to said gas cooler.

13. The demineralization system of claim 12, wherein said secondary heat exchanger is connected to said primary heat exchanger.

14. The demineralization system of claim 13, wherein said drying chamber produces salt slush which comprises by weight, less than about 75% salt.

15. A process for demineralization of brine using the demineralization system of claim 1, wherein said process comprises:
obtaining flue gas from said gas source,
passing said flue gas through said gas cooler such that the temperature of said flue gas after exiting said gas cooler is lower than the temperature of said flue gas before entering said gas cooler,
passing the lower temperature flue gas to said spray dryer,
feeding said cooled flue gas to said compressor,
mixing the lower temperature flue gas with heated brine forming a mixture, and
spraying/atomizing said mixture.

16. The process of claim 15, wherein the process does not generate sulfuric acid.

17. The process of claim 15, further comprising the step of passing water vapor from said spray dryer through said primary heat exchanger.

18. The process of claim 17, further comprising the step of obtaining brine through a brine intake.

19. The process of claim 18, wherein said water vapor from said spray dryer and brine from said brine intake passes through said primary heat exchanger, and said water vapor heats said brine to a temperature in the range between about 80 to about 130° C.

* * * * *

UNITED STATES PATENT AND TRADEMARK OFFICE
CERTIFICATE OF CORRECTION

| | |
|---|---|
| PATENT NO. | : 11,667,544 B2 |
| APPLICATION NO. | : 17/142620 |
| DATED | : June 6, 2023 |
| INVENTOR(S) | : Shahram Shafie and Roberta S. Magnuson |

It is certified that error appears in the above-identified patent and that said Letters Patent is hereby corrected as shown below:

In the Claims

Column 13, Line 62-63, Claim 3, "The demineralization system of claim 1, wherein said source of is a power plant or a factory." should be replaced by:
"The demineralization system of claim 1, wherein said gas source is a power plant or a factory."

Signed and Sealed this
Twenty-third Day of January, 2024

Katherine Kelly Vidal
*Director of the United States Patent and Trademark Office*